Figure 8:
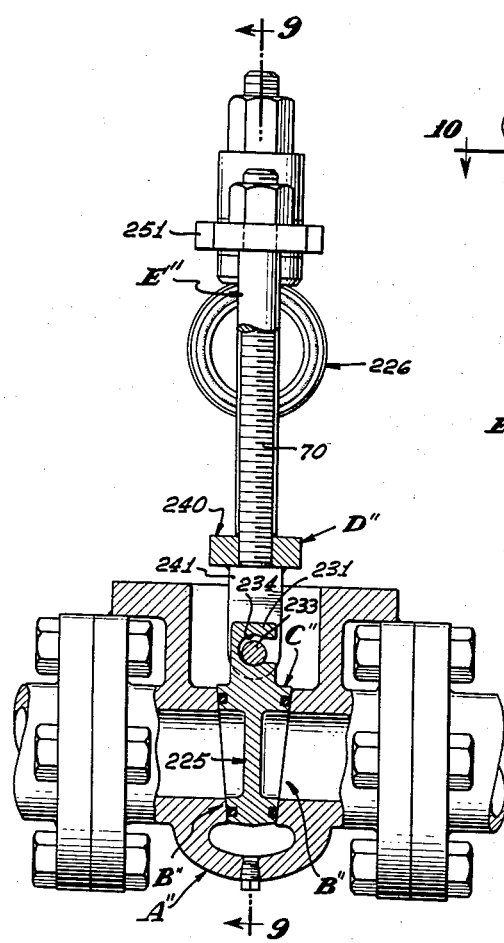

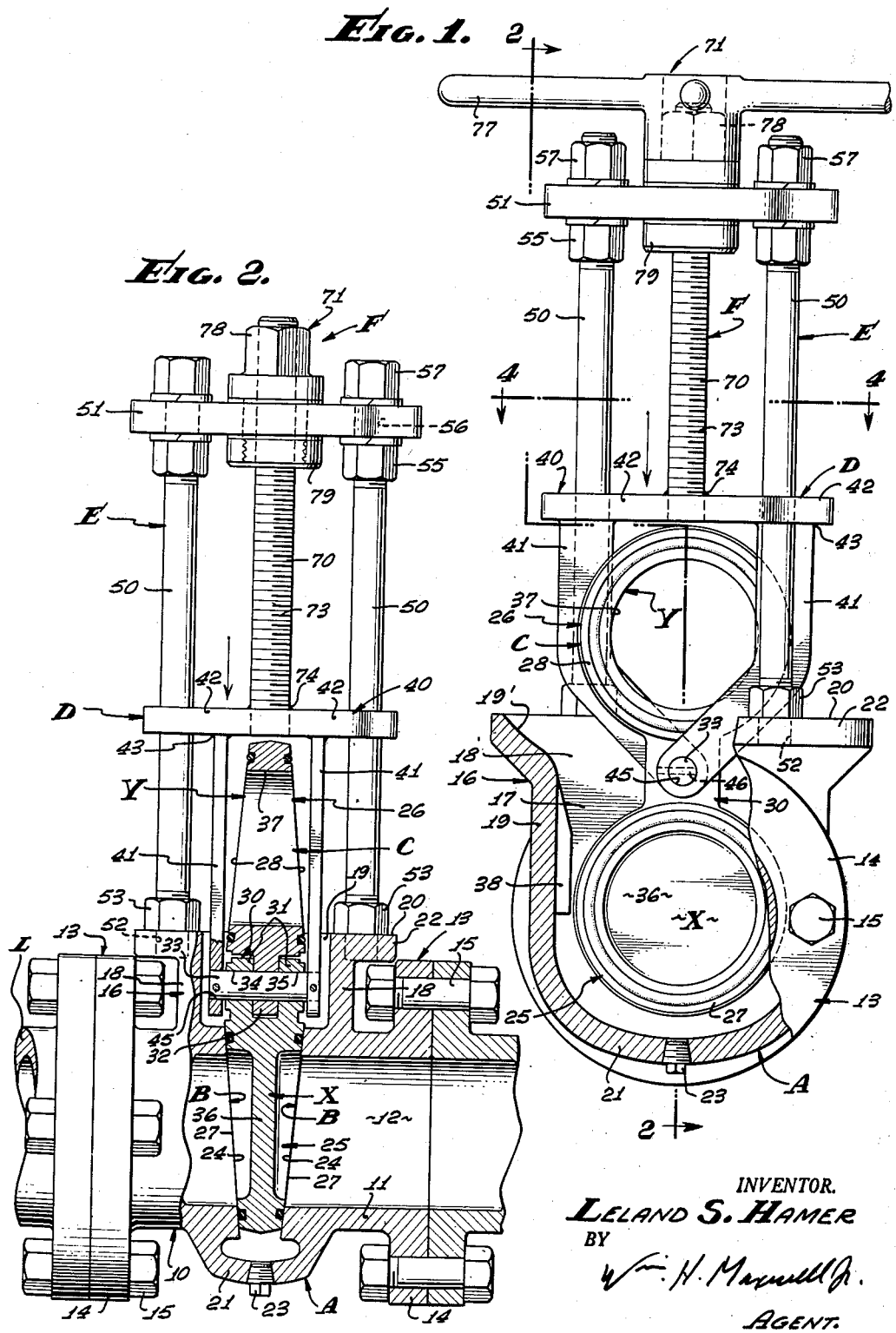
Aug. 5, 1958 — L. S. HAMER — 2,845,954
VISIBLE WEDGE VALVE
Filed Feb. 28, 1955 — 4 Sheets-Sheet 1
INVENTOR.
LELAND S. HAMER
BY
AGENT.

Aug. 5, 1958  L. S. HAMER  2,845,954
VISIBLE WEDGE VALVE
Filed Feb. 28, 1955  4 Sheets-Sheet 2
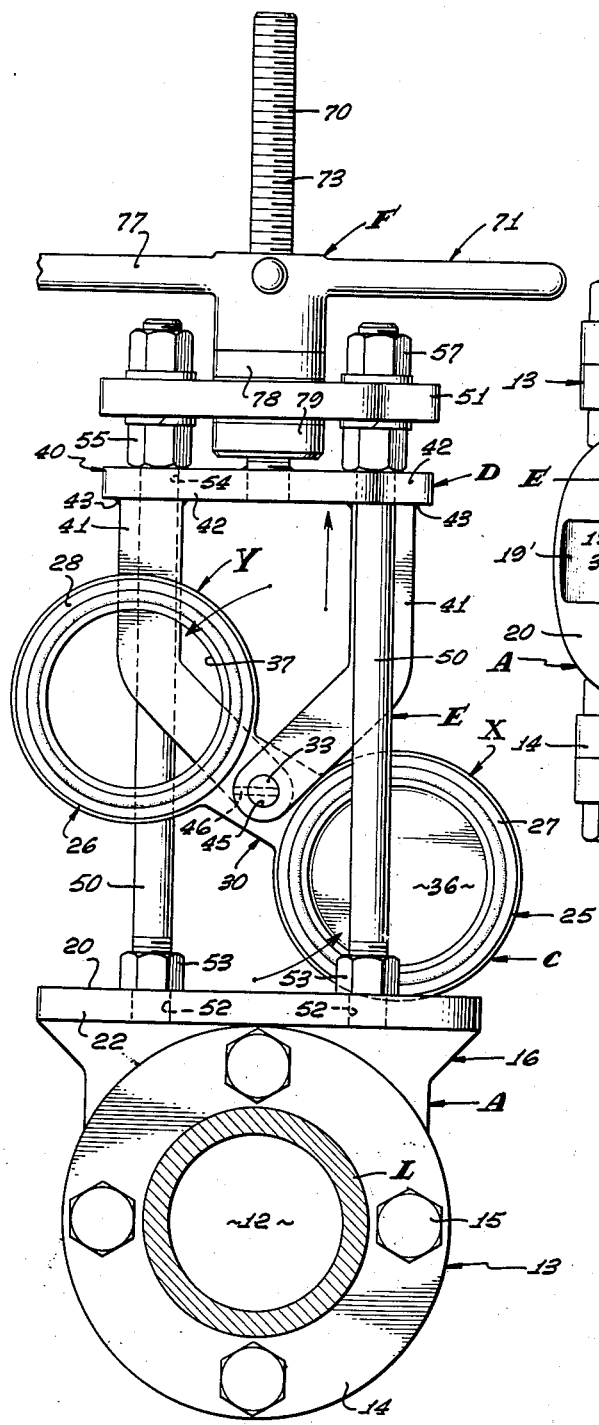
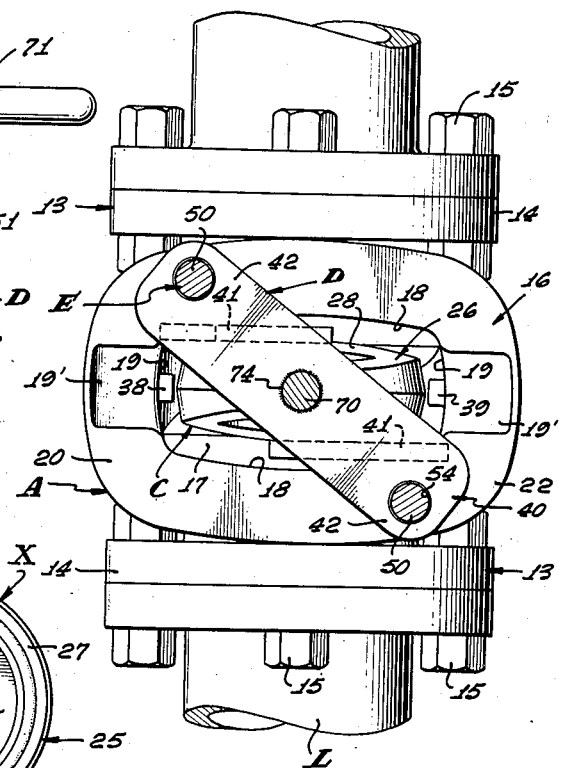
INVENTOR.
LELAND S. HAMER
BY
Wm. H. Maxwell Jr.
AGENT.

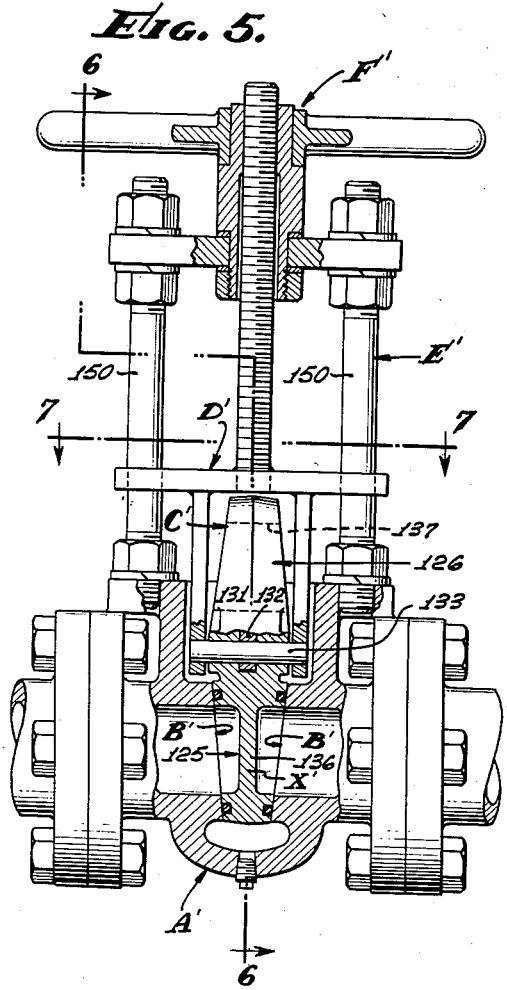
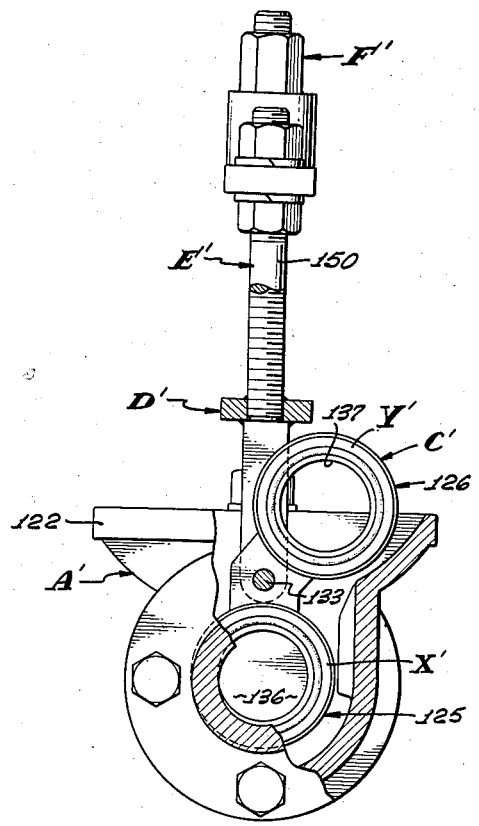
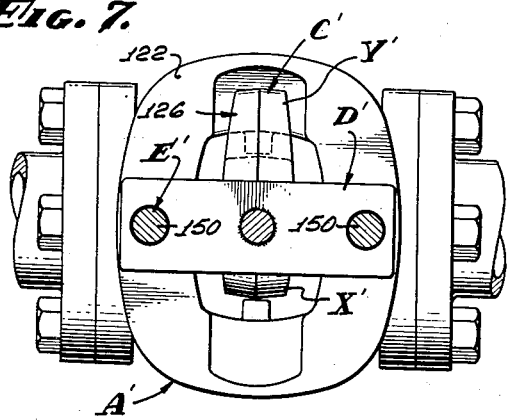

Aug. 5, 1958 L. S. HAMER 2,845,954
VISIBLE WEDGE VALVE
Filed Feb. 28, 1955 4 Sheets-Sheet 4

INVENTOR.
LELAND S. HAMER
BY
AGENT.

ically to the body A and which are adapted to have flat seating engagement with the faces 24. The
United States Patent Office 2,845,954
Patented Aug. 5, 1958

2,845,954
VISIBLE WEDGE VALVE
Leland S. Hamer, Long Beach, Calif.

Application February 28, 1955, Serial No. 490,937

7 Claims. (Cl. 138—94.5)

This invention has to do with a valve adapted to control flow of fluid through a pipe line and is particularly concerned with a shut-off valve for positively opening and/or closing the pipe line, it being a general object of this invention to provide improved handling and visibility of the means provided for opening and/or closing a pipe line.

Heretofore, the wedge-shaped valve elements of valves of the type under consideration have been partially or completely housed so that the operation or condition of the valve cannot be seen, and, in many instances, not even determined. The position of the shut-off element is important and it is highly desirable to facilitate access to the shut-off element, both physical access and visual access. Access to the shut-off element is particularly important in the case of large manifold installations that employ a great number of valves in which case it is highly desirable to be able, at a glance, to determine the shut-off and open positions of the many valves. The disadvantage of being unable to determine this condition of the valves has been completely eliminated in the visible wedge valve of the present invention.

It is an object of this invention to provide a valve construction wherein the valve element is completely accessible and visible at all times and which acts to positively open and/or close the pipe line controlled by the valve.

Another object of this invention is to provide a wedge type valve element and construction which is under full control at all times so that the valve element is not subject to being blown out of place by pressure from within the pipe line carrying the valve.

A further object of this invention is to provide a valve of the character referred to with a simple improved means for controlling or shifting the valve element of the structure to break loose and raise the element and to lower and drive the element into tight sealing engagement with the valve body. In the preferred form of the invention the valve has a double ended valve element so that it is shiftable vertically of the structure and so that it may be easily reversed end-for-end without removal from the structure.

Another object of this invention is to provide a simple inexpensive and effective means for raising and lowering the valve element whereby the element is guided into and out of the seating position where it handles flow through the structure. In accordance with the invention I provide a carriage for shiftably and rotatably supporting the valve element so that it can be easily and quickly manipulated into and out of seating position within the body of the valve.

Figure 9:
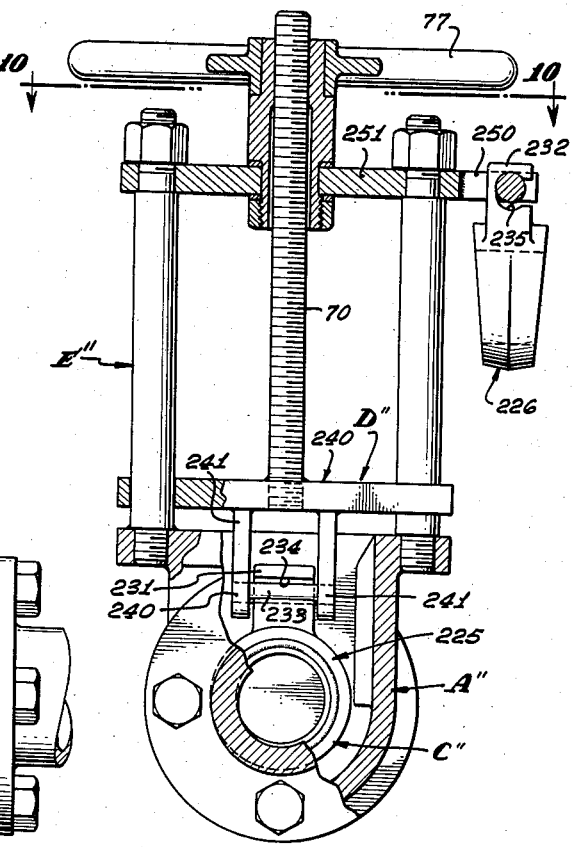
Figure 10:
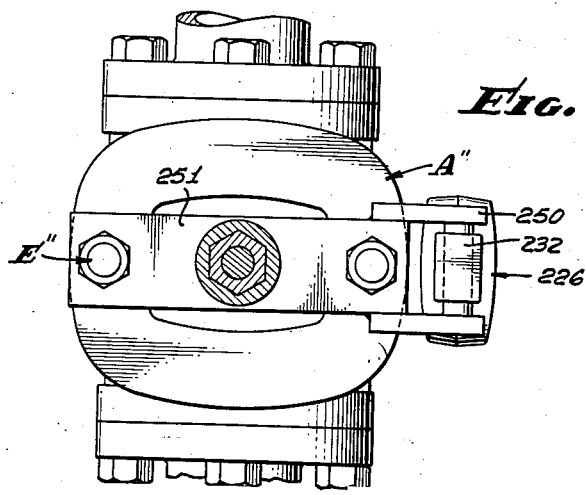

The various objects and features of my invention will be fully understood from the following detailed description of the typical preferred forms and applications of my invention, throughout which description reference is made to the accompanying drawings, in which:

Fig. 1 is a transverse vertical sectional view through the visible wedge valve that I have provided. Fig. 2 is a longitudinal sectional view taken as indicated by line 2—2 on Fig. 1, showing the valve connected in a pipe line. Fig. 3 is a view similar to Fig. 1 and showing the parts of the valve in a different operative position. Fig. 4 is a plan view taken as indicated by line 4—4 on Fig. 1. Fig. 5 is a view similar to Fig. 2 and showing a second form of the present invention. Fig. 6 is a transverse sectional view taken as indicated by line 6—6 on Fig. 5, and Fig. 7 is a plan section taken as indicated by line 7—7 on Fig. 5. Fig. 8 is a view similar to Figs. 2 and 5 and showing a third form of the present invention. Fig. 9 is a transverse sectional view taken as indicated by line 9—9 on Fig. 8, and Fig. 10 is a plan section taken as indicated by line 10—10 on Fig. 9.

The visible wedge valve of the present invention is adapted to be inserted in a pipe line L, or the like, and, as clearly illustrated in Figs. 1 to 4 of the drawings, involves, generally, a body A with couplings adapted to secure the valve in the pipe line, seats B carried in the body, a valve element C adapted to be engaged with the seats B to open or close the valve, a carriage D for shiftably handling and supporting the valve element C, guide means E for the carriage, and operating means F adapted to shift the carriage to raise and lower the valve element C into and out of cooperative engagement with the seats B.

The body A is adapted to be inserted in the pipe line L and is provided to handle flow of fluid to be controlled by the valve. The body A is characterized by an elongate tubular part 10 having a wall 11 forming a flow passage 12 that opens at the ends of the body. Couplings 13 are at the ends of the part 10 and may be in the form of flanges 14, or the like, provided with openings for receiving suitable fasteners, such as bolts 15, or the like. It is to be understood that the ends of the part 10 may be secured to the sections of the pipe line L in any suitable manner, as by welding.

The body A also involves an extension 16 that projects laterally from the part 10 midway between the ends thereof and forms a chamber 17 that intersects the passage 12. The extension 16 is vertically disposed and normal to the longitudinal axis of the body A and has longitudinally spaced end walls 18 and laterally spaced side walls 19. As clearly shown in Figs. 1 and 2 of the drawings, the extension 16 opens upwardly terminating in a flat top 20 in a plane spaced from and parallel to the axis of part 10 and is closed at its lower side by a bottom wall 21 forming a pocket adapted to catch fluid. A reinforcing flange 22 encircles the upper end portion of the extension 16 and projects laterally from the walls 18 and 19 in the plane of the top 20. A suitable drain plug 23, or the like, is provided to open the bottom of the extension 16 for drainage when desired.

The seats B are preferably integrally formed with the body A and are provided to receive the valve element C hereinafter described, and each seat is preferably carried in the body A on an axis somewhat inclined to the central longitudinal axis of the body A. The seats B are opposed to each other and are annular parts having opposed angularly related seating faces 24. The seating faces 24 are upwardly and outwardly divergent as best shown in Fig. 2 of the drawings.

In the form of the invention illustrated in Figs. 1 to 4 of the drawings, the valve element C is an elongate part having a pair of like flow controlling wedges 25 and 26 adapted to be forced into tight seating and sealing engagement between the faces 24 of the seats B.

The wedges 25 and 26 are essentially alike and each is a flat tapered part having flat angularly related faces 27 and 28, respectively, that face in opposite directions longitudinally of the body A and which are adapted to have flat seating engagement with the faces 24. The faces 27 and 28 are outwardly convergent and may be circular in configuration, as shown in Fig. 1 of the drawings, and are connected together at their inner ends by an arm 30. The wedges 25 and 26 are preferably separate parts in order to simplify machining of the wedges, in which case the wedges 25 and 26 have ears 31 and 32, respectively, projecting laterally therefrom and overlapped with each other. The ears 31 and 32 are shaped so that they are keyed together and they are fastened against separation by a pin 33 that passes through registering openings 34 and 35 which are provided in the ears.

The valve element C is provided to open and close the flow passage 21, and, therefore, the valve element is reversible having an imperforate section X and a perforate section Y. Suitable sealing rings are carried in the wedges to have sealing engagement with the two faces 24. As illustrated, the wedge 25 forms the section X and is provided with a wall 36, while the wedge 26 forms the section Y and is provided with an opening 37 corresponding in diameter to the flow passage 12. When the wedge 25 is in seating engagement with the seats B the wall 36 positively closes or shuts off flow through the passage 12, and when the wedge 26 is in seating engagement the opening 37 forms a continuation of the flow passage 12 allowing for full, free flow through the body A of the valve.

As shown in Figs. 1 and 4 of the drawings, guide ribs 38 and 39 are provided at diametrically opposite sides of the chamber 17. The ribs 38 and 39 are vertically disposed and projecting inwardly from the walls 19. As shown in Fig. 1 the uppermost portion of the ribs are tapered and fare into the upper end portions of the walls 19. The walls 19 are beveled at 19' so that the wedges 25 and 26 may be readily rotated end for end without retracting them any farther than necessary from the chamber 17. The ribs 38 and 39 are parallel with each other and engage with the wedges 25 and 26 at opposite sides thereof. With this relationship of parts the wedges 25 and 26 are accurately guided into and out of position between the seats B.

The carriage D is provided to shiftably handle and carry the wedges of the valve into and out of the chamber 17 where the wedges cooperate with the seats B to open or close the passage 12. In the form of the invention illustrated in Figs. 1 to 4 of the drawings, the carriage D shiftably handles and rotatably carries the wedges 25 and 26 of the valve element C. As clearly shown in Figs. 1 and 2 of the drawings, the pin 33 extends longitudinally of the body A on an axis spaced from the central axis of the body and projects outwardly from the ears 31 of the wedge 25. The carriage D involves, generally, a head 40 positioned above the valve element C and a pair of laterally and longitudinally spaced arms 41 that depend from the head 40 at the sides of the valve to carry the valve element. As shown, the arms depend downwardly and then inwardly, there being an arm at each end of the valve element C adjacent the faces thereof.

It is a feature of the form of the invention shown in Figs. 1 to 4 of the drawings, that the arms 41 are laterally offset from the center axis of the valve structure so that the valve element C which is necessarily centralized is easily accessible and clearly visible at all times. The head 40 is a simple horizontally disposed member that extends transversely across the valve and the arms 41 depend from the side portions 42 of the head 40. The arms 41 are secured to the head 40 as by welding 43 and are spaced a substantial distance apart laterally as well as being spaced apart longitudinally of the valve. With this positioning of the arms 41 there is one arm at the front and one side of the valve element C, and one arm at the back and other side of the valve element C. The arms 41 depend vertically from the side portions 42 of the heads and are turned inwardly at their lower end portions so that the said lower end portions of the arms overlap at a point located centrally of the structure (see Fig. 1). With this arrangement of parts the valve element C carried by the arms is clearly visible and at the same time is supported so that it can be rotated end for end.

Aligned bearing openings 45 are provided at the lower ends of the arms to be engaged with the end portions of the pin 33. Cotters 46, or like pins, may be provided to secure the arms to the end portions of the pin 33. It will be apparent that the carriage D supports the valve element C so that it can be raised and lowered and so that it can be rotated end for end, depending upon which wedge is to be engaged between the faces 24.

The guide means E is provided to control movement of the carriage vertically of the structure and involves a pair of laterally and longitudinally spaced pillars or supports 50, and a header 51 carried by the supports. The supports are adapted to cooperate with the carriage so that the carriage is held against rotation. The supports 50 are vertically disposed rod-like parts that project upwardly from the sides of the body A. In practice, the supports 50 are carried directly by the extension 16 and and are threaded into openings 52 in the flange 22. Suitable lock nuts 53 are threaded onto the supports and engage the flat top 20 of the extension to positively position the supports. The upper end portions of the supports 50 are threaded and locating nuts 55 are threadedly carried thereon to support the header 51. The upper end portions of the supports pass through openings 56 in the side portions of the header and stop nuts 57 are threaded onto the ends of the supports to lock the header 51 in proper operating position.

It is a feature of the form of the invention under consideration that the supports 50 are laterally offset from the center axis of the valve structure so that the valve element C which is necessarily centralized is easily accessible and clearly visible at all times. The supports 50 are simple vertically disposed members that project upwardly from the flange 22 and are spaced a substantial distance apart laterally as well as being spaced apart longitudinally of the valve. With this positioning of the supports 50 there is one support at the front and one side of the valve element C, and one support at the back and other side of the valve element C.

In accordance with the invention, the header 51 is carried at the uppermost ends of the supports 50 and extends diagonally across the structure to tie the support together and to carry parts of the operating means E hereinafter described. As clearly shown in Figs. 2 and 4 of the drawings, the supports 50 pass through openings 54 in the side portions of the head 40 adjacent to and longitudinally spaced from the point where the arms 41 depend from the head. The openings 54 slidably pass the head 40 so that the head and related parts are free to shift vertically of the structure.

In order to raise and lower the carriage D and valve element C of valve structure thus far described, the operating means F is operated to apply the necessary force to adequately handle and move the valve element as required. As shown, the means F is a mechanical means and involves, generally, an operating stem 70 coupled to the head 40, and a manually operable means 71 for shifting the stem 70. The operating stem 70 extends vertically of the structure between the supports 50 and is an elongate cylindrically shaped part having external screw threads 73. The stem 70 is threaded into the head 40 and held against rotation relative thereto by means of welding at 74 on the top of the head 40.

The manually operable means 71 is provided to move the stem 70 vertically upwardly and downwardly, and preferably involves a hand wheel 77 that drives an internally threaded nut 78 engaged with the threads 73 on the stem 70. The nut 78 is confined to the header by a suitable retaining sleeve 79 and when the nut is rotated the stem is shifted or moved vertically. With the structure thus far described it will be apparent that the individual wedges are raised and lowered by the carriage D and operating means F. That is, the valve element may be raised so that the desired wedge may be selected, and the valve element may be lowered and forced into seating engagement with the seats B.

In the second form of the invention illustrated in Figs. 5 to 7 of the drawings, the body A' and seats B' are identical to the body A and seats B above described. The valve element C', carriage D' and guide E' are, however, of modified construction. In the second form of the invention the valve element is characterized by angularly related wedges 125 and 126, each of which is essentially the same as the wedges 25 and 26 above described. By angularly relating the wedges the overall height of the valve structure is decreased as clearly shown in Fig. 6 of the drawings. Further, the free or unused wedge is accessible and visible at the side of the valve structure so that the condition of the valve is readily determined.

The valve element C' is a reversible element having an imperforate section X' and a perforate section Y'. As illustrated in Figs. 5 to 7 of the drawings, the wedge 125 forms the section X' and is provided with a wall 136 while the wedge 126 forms the section Y' and is provided with an opening 137 corresponding in diameter to the flow passage through the valve body. It is a feature of this form of the invention that the sections X' and Y' are angularly related in order to decrease the height of the valve and to place the unused valve section in a position where it is clearly visible. The wedges 125 and 126 are preferably separate parts joined by ears 131 and 132 projecting laterally therefrom and overlapped with each other. The ears 131 and 132 are angularly shaped parts that are keyed together and fastened against separation by a pin 133. The pin 133 intersects the central vertical axis of the valve structure while the ears 131 and 132 hold the unused wedge angularly related to the vertical axis of the valve structure and offset laterally therefrom. For example, the centers of the wedges 125 and 126 are about 140° apart relative to the center pin 133. With this relationship of parts the pin 133 has centered seating engagement with the wedge engaged with the seats B' while the unused wedge is positioned at one side of the valve to project substantially above the flange 122.

The carriage D' is generally the same as the carriage D above described, except that in the form of the invention under consideration the structure is materially reduced in height due to the angular relationship of the wedges and due to the fact that it is only necessary to rotate the valve element C' in one direction. The guide E' is correspondingly shortened in height, and the operating means F' is identical to the means F, above described. Further, the pillars or supports 150 are positioned at opposite ends of the valve in line with the central axis of the body A'.

In the third form of the invention illustrated in Figs. 8 to 10 of the drawings, the body A'' and seats B'' are identical to the body A and seats B above described. However, the valve element C'', carriage D'' and guide means E'' are of modified construction. In this form of the invention the valve element is divided into two separate wedges 225 and 226 adapted to be forced into tight seating and sealing engagement between the faces of the seats B''. The wedges 225 and 226 are essentially alike and are identical to the wedges 25 and 26 above described, with the exception of the ears 31 and 32. In the case now under consideration the ears 231 and 232 are not overlapped and joined together, but they are provided with transverse openings 234 and 235, respectively.

The openings 234 and 235 extend across the ears from one side to the other thereof and each has a lateral opening faced forwardly or rearwardly as the case may be, in order to receive the pin 233 that is carried by the arms 241. In other words, the ears 235 and 234 present hook-shaped parts adapted to be engaged by the pin 233 to support the wedges. In practice, the openings 234 and 235 are round in cross sections and have the lateral opening at the forward or rearward side that is somewhat less in vertical extent than the openings. With this relationship of parts the pin 233 has centered seating engagement with the wedge, and the wedge can be readily removed or applied to the pin.

The carriage D'' is generally the same as the carriage D above described, except that in this form of the invention the valve is reduced in height by the removal of one of the wedges. That is, only one wedge is employed or carried in the valve structure at one time. Therefore, the arms 241 that depend from the head 240 are of limited or minimum vertical extent and are centrally located on the head. The guide E'' is correspondingly shortened in height. In order to handle the wedge that is unemployed a hanger 250 is provided at one side of the header 251 where the unused wedge may be stored. The operating means F'' is identical to the means F above described.

From the foregoing it will be observed that I have provided extremely simple valve constructions wherein the valve element is visible at all times so that a person operating the valve can readily determine the action thereof. With the structure of the present invention the valve element can be quickly manipulated by simple rotation of the hand wheel, whereby the stem is raised or lowered, as desired, to move the valve element into and out of operating position to either open or close the passage through the body of the valve. In the first two described forms of the invention, it is a simple matter to swing the desired wedge into approximately vertical alignment, whereupon the ribs projecting from the walls 19 act to direct the wedges accurately into place between the seats. In the later described form of the invention, it is a simple matter to hook the desired wedge 225 and or 226 onto the pin 233, whereupon the operating means is manipulated. When it is desired to secure the valve in operating condition it is merely necessary to apply sufficient pressure to the hand wheel 77 whereupon the stem 70 urges the carriage and valve element downwardly into seating and sealing engagement with the seats B.

Having described only the typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A visible valve of the character described including, an elongate horizontally disposed unitary tubular body having a central longitudinal flow passage extending therethrough, an upwardly opening extension projecting upwardly from the body mid-way between the ends thereof and defining a chamber intersecting the flow passage, a pair of annular seats in the body concentric with the flow passage and occurring within the said chamber and spaced apart longitudinally of the body, a shiftable valve element movable into and out of seating engagement with the spaced seats, a plurality of vertically disposed supports fixed to and projecting upwardly from the extension, and a vertically shiftable carriage overlying the extension and supporting the valve element to raise and lower the valve element into and out of engagement with the seats and including a shiftable head engageable with the supports and spaced arms depending from the head and carrying the valve element.

2. A visible wedge valve of the character described including, an elongate horizontally disposed unitary tubular body having a central longitudinal flow passage extending therethrough, an upwardly opening extension projecting laterally upwardly from the body intermediate the ends thereof and defining a chamber intersecting and in open communication with the said flow passage, a pair of angularly related longitudinally spaced annular seats in the body concentric with the flow passage and occurring within the said chamber, a shiftable valve element having oppositely disposed inclined faces, supporting means carried by and projecting upwardly from the extension, a vertically shiftable carriage supporting the valve element to raise and lower the said element into and out of the chamber and into and out of sealing engagement with the seats and including, a vertically shiftable head carried by the support means to overlie the extension and laterally spaced arms depending from the head and carrying the valve element, said support means including guide rods projecting upwardly from the extension and slidably engaging the carriage.

3. A visible valve of the character described including, an elongate horizontally disposed unitary tubular body having a central longitudinal flow passage extending therethrough, an extension projecting laterally upwardly from the body intermediate the ends thereof and defining an upwardly opening chamber intersecting and establishing open communication with the flow passage, longitudinally spaced annular seats concentric with the flow passage in the body and occurring within the said chamber, a shiftable valve element movable into and out of the chamber through the upper open end thereof and into and out of seating engagement with the spaced seats, a vertically shiftable carriage supporting the valve element to raise and lower the element into and out of the chamber and into and out of seating engagement with the seats and including, a head spaced above the extension, laterally and longitudinally spaced arms depending from the head and carrying the valve element, and laterally and longitudinally spaced guide rods projecting upwardly from the extension and shiftably supporting the carriage.

4. A visible wedge valve of the character described including, an elongate horizontally disposed unitary tubular body having a central longitudinal flow passage extending therethrough, an enlargement intermediate the ends of the body and defining a chamber intersecting and establishing open communication with the flow passage, said enlargement having an open top, a pair of longitudinally spaced annular seats in the body concentric with the flow passage and occurring within the said chamber, an elongate vertically shiftable valve element having a pair of wedges adapted to be selectively shifted into and out of the chamber from the open top thereof and into and out of seating engagement with the spaced seats therein, a vertically shiftable carriage including a substantially flat horizontally disposed head spaced above the enlargement and the valve element, and laterally spaced arms depending from the head and having their lower end portions overlapped and pivotally carrying the valve element, and laterally spaced guide rods projecting upwardly from the enlargement, there being vertical guide openings in the head and freely passing the rods.

5. A visible wedge valve of the character described including, an elongate horizontally disposed tubular body having a central longitudinal flow passage extending therethrough, an upwardly opening enlargement intermediate the ends of the body and defining a chamber intersecting and establishing open communication with the flow passage, a pair of opposed longitudinally spaced and downwardly convergent annular seats in the body concentric with the flow passage and occurring within the said chamber, an elongate vertically shiftable valve element having longitudinally spaced wedge sections with oppositely disposed inclined faces and an intermediate connecting arm extending between the sections, each section being selectively movable into and out of the chamber through the upper portion thereof and into and out of wedging seating engagement with the spaced seats, a vertically shiftable carriage spaced above the enlargement and the valve member including, a flat horizontally disposed head above the valve element, a pair of alterally spaced arms depending from the head and having their lower end portions inclined to occur adjacent the opposite sides of the connecting arm of the valve member, and a pin extending between the end portions of the arm and pivotally engaging the said connecting arm of the valve member, and laterally spaced guide rods projecting upwardly from the enlargement, there being vertical guide openings in the head freely passing the rods.

6. A visible wedge valve of the character described including, an elongate horizontally disposed unitary tubular body having a central longitudinal flow passage extending therethrough, an upwardly opening enlargement intermeidate the ends of the body and defining a chamber intersecting and in open communication with the flow passage, a pair of opposed longitudinally spaced and downwardly convergent annular seats in the body and occurring within the said chamber, an elongate vertically shiftable valve element having a central connecting arm, an imperforate wedge section at one end of the arm and a perforated wedge section at the other end of the arm, each of the said wedge sections being selectively movable into and out of engagement in the chamber and with the spaced seats, a vertically shiftable carriage spaced above the enlargement and rotatably supporting the valve element at the connecting arm thereof and adapted to raise and lower one or othe other of the wedge sections of the valve element into and out of engagement in the chamber and with the said seats, a plurality of laterally and longitudinally spaced guide rods projecting upwardly from the enlargement to terminate above the carriage, there being guide openings in the carriage slidably passing the rods, and operating means for the carriage including, a stem coupled to and projecting upwardly from the carriage, a header fixed to and extending between the upper end portions of the rods, a nut rotatably carried by the header and engaging the stem to shift the stem and a hand wheel fixed to and carried by the nut.

7. A visible wedge valve of the character described including, an elongate horizontally disposed unitary tubular body having a central longitudinal flow passage extending therethrough, an enlargement intermediate the ends of the body defining a chamber intersecting the flow passage and having a open top, a pair of longitudinally spaced annular seats in the body concentric with the flow passage and occurring within the said chamber, an alongate shiftable valve element having a central connecting arm, an imperforate wedge at one end of the arm and a perforated wedge at the other end of the arm, each of the wedges being selectively movable into and out of the chamber and into and out of seating engagement with the seats, a vertically shiftable carriage above the enlargement including, a head above the valve element, and laterally spaced arms depending from the head and having end portions occurring adjacent the opposite sides of and pivotally connected to the connecting arm of the valve element, laterally spaced guide rods fixed to and projecting upwardly from the enlargement to terminate above the head, there being guide openings in the head passing the rods, and an operating means including a threaded stem coupled to the carriage to project upwardly therefrom and a means for shifting the stem and including a header secured to the upper ends of the rods and passing the stem and a nut rotatably carried by the header and engaged on the stem.

References Cited in the file of this patent

UNITED STATES PATENTS

| | | |
|---|---|---|
| 1,753,524 | Mawby | Apr. 8, 1930 |
| 1,933,182 | Pagon | Oct. 31, 1933 |
| 2,031,151 | Eulberg | Feb. 18, 1936 |